United States Patent [19]

Miyamoto

[11] 4,270,846
[45] Jun. 2, 1981

[54] ELECTRO-OPTICAL DISPLAY DEVICE

[75] Inventor: Masao Miyamoto, Tokyo, Japan

[73] Assignee: Kabushiki Kaisha Deini Seikosha, Tokyo, Japan

[21] Appl. No.: 971,824

[22] Filed: Dec. 21, 1978

[30] Foreign Application Priority Data

Dec. 26, 1977 [JP] Japan .............................. 52-159152

[51] Int. Cl.³ ............................................. G02F 1/133
[52] U.S. Cl. .................................... 350/336; 350/374; 350/334; 368/30; 368/242
[58] Field of Search ............... 58/4 A, 50 R; 350/331, 350/334, 150, 336; 368/30, 242

[56] References Cited

U.S. PATENT DOCUMENTS

| | | | |
|---|---|---|---|
| 3,731,986 | 5/1973 | Fergason | 350/331 X |
| 3,738,099 | 6/1973 | Tanaka | 58/4 A X |
| 3,922,842 | 12/1975 | Fujita | 58/4 A |
| 4,020,627 | 5/1977 | Yoshida et al. | 58/4 A X |

*Primary Examiner*—Edward S. Bauer
*Attorney, Agent, or Firm*—Robert E. Burns; Emmanuel J. Lobato; Bruce L. Adams

[57] ABSTRACT

An electro-optical display device comprises electro-optical material sandwiched between a pair of substrates each having formed thereon electrodes. The electrodes on one substrate comprise a segment display electrode part comprised of a plurality of seven-segment electrodes, and a dot matrix display electrode part comprised of a plurality of parallel linear electrodes. The electrodes on the other substrate comprise a complementary counter electrode part corresponding to the segment display electrode part, and a complementary counter electrode part comprised of a plurality of parallel linear electrodes perpendicularly intersecting the linear electrodes formed on the other substrate. The electrode leads which are connected to some of the seven-segment electrodes also comprise some of the linear electrodes of the dot matrix display thereby reducing the overall number of separate electrodes and enabling construction of a more simple display device.

13 Claims, 6 Drawing Figures

F I G . 6
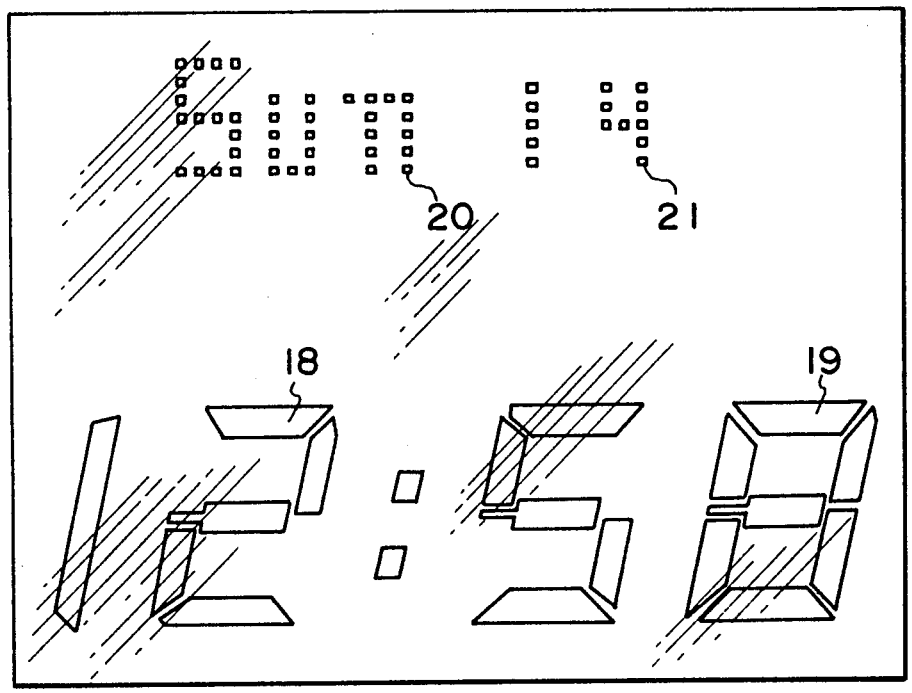

ELECTRO-OPTICAL DISPLAY DEVICE

BACKGROUND OF THE INVENTION

This invention relates to an electro-optical display device having both a segment display and a dot matrix display employing electro-optical material, e.g., liquid crystal, PLZT or single crystal material which exhibits the electro-optical effect such as gadolinium molybdate.

Recently, a micro calculator, a watch or the like having a digital display have become more popular due to the development of the electro-optical material, e.g., liquid crystal. On the display device of the micro calculator or watch, an electrode structure of the 7-segment type, which forms the numeral letter 8, is generally used for displaying numerals and letters. Further a dot matrix display device using liquid crystal has been developed for the display part of the terminal equipment of a computer. An advantage according to the segment display is that it is able to display numeral letters or simple letters. The dot matrix display is disadvantageous in that it needs many electrodes for display. The dot matrix display, however, has an advantage in that it can provide almost all displays, e.g., numeral letters or letters and give fine numeral letter or letter displays. Furthermore, by providing a memory circuit and suitably selecting a decoder, it is possible to easily change the letter for display.

On the liquid crystal display for a watch, the segment display of the 7-segment type which forms the figure 8 is used for displaying the information of time. In a timepiece, the display of hour, minute, second, date, year or the like by numeral letters using the segment display of the 7-segment type can be readily obtained. However, displaying letters, e.g., 7 days, by the segment display has disadvantages which makes the letter large in part and makes the letter difficult to read. Using the display, it is almost impossible to change English letters, Japanese letters or the like to another letter.

It is an object of the invention to overcome the foregoing disadvantages. It is another object of the invention to provide an electro-optical display device which has fine display letters and a means to change easily the letter, e.g., Japanese letters or English letters. It is another object of the invention to provide an electro-optical display device which has a simple structure and has merits of both the dot matrix display and the segment display.

BRIEF DESCRIPTION OF THE DRAWING

FIG. 6 is a plan view showing a display example according to the display device of the invention.

DETAILED DESCRIPTION OF INVENTION

Figure 1:
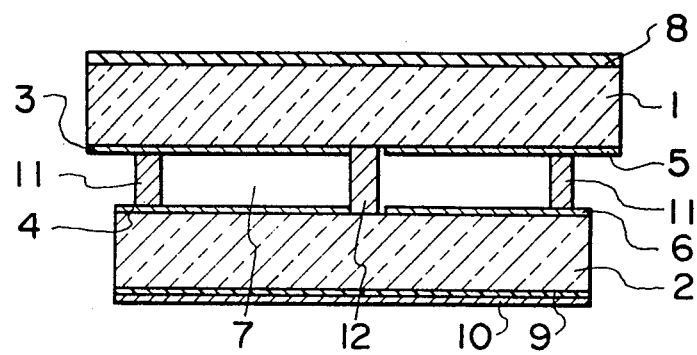
FIG. 1 is a cross-sectional view showing an electro-optical display device which has a dot matrix display part and a segment display part.

FIG. 1 shows an embodiment of the invention in the case of using liquid crystal as an electro-optical material.

On the inner surface of a first transparent substrate 1, transparent display electrodes, which comprise a segment display electrode part 3 and a dot matrix display electrode part 5, are formed, as shown in FIG. 1. A linear polarizer 8 is attached on the upper surface of the transparent substrate 1. On the inner surface of a second transparent substrate 2, transparent counter electrodes, which comprise a counter electrode part 4 for the segment display electrode part 3 and a counter electrode part 6 for the dot matrix disply electrode part 5, are formed. On the lower surface of the second transparent substrate 2 is provided a linear polarizer 9 (the polarizing axis of which is perpendicular to that of said linear polarizer 8). On the lower surface of the polarizer 9, a reflector 10 is attached. Liquid crystal 7 is filled in the cell formed by the first transparent substrate 1, the second transparent substrate 2 and a spacer 11 which forms a gap between those substrates and is also used as a bonding agent.

In case of needing to use different kinds of liquid crystal material for the segment display and dot matrix display, respectively, it is necessary to divide the cell into two parts by a sealing member 12 (as shown in FIG. 1) and to fill predetermined liquid crystal in each cell respectively.

In the above embodiment, both of the electro-optical materials in the two cells are liquid crystals. However, in the case of at least one of those being a solid display element, e.g., PLZT, it is not necessary to provide the sealing member 12 separating the cells.

In the case of the electro-optical material being only a solid display element, it is possible to attach electrodes on the electro-optical material directly and the first and second transparent substrates become useless.

In FIG. 1, the alignment treatments on the segment display electrode part 3 and the dot matrix display electrode part 5 are performed in the same direction to that of the polarizing axis of the polarizer 8. The alignment treatments on the opposed electrodes 4 and 6 are respectively performed in the right-angle direction to the treatment direction of the display electrode parts 3 and 5. Therefore, the liquid crystal 7 becomes twisted about 90 degrees from the electrode parts for displays 3 and 5 to the opposite electrode parts 4 and 6.

If desired, the liquid crystal of the segment display part and that of the dot matrix display part may be given different orientation to each other. For example, if the liquid crystal of the segment display part is given a parallel orientation and that of the matrix display part is given a right-angle orientation to that of the opposite surface, i.e., a twisted type of orientation, and the direction of polarization of the polarizer in each part is selected properly, the segment display part gives a white display on a black ground and the matrix display part gives a black display on a white ground.

It is possible to design a variety of displays by using different kinds of electro-optical materials, e.g., a liquid crystal and PLZT, or a nematic liquid crystal exhibiting homogeneous orientation and a nematic liquid crystal exhibiting homeotropic orientation.

It is possible to not use a field-effect type of liquid crystal and to use a dynamic scattering type of liquid crystal. In this case, it is desirable to make the liquid crystal orient perpendicularly to the surface of the substrate for improvement of contrast. The polarizers 8 and 9 as shown in FIG. 1 are not necessary and the opposite electrodes 4 and 6 may be made from metal.

Figure 2:
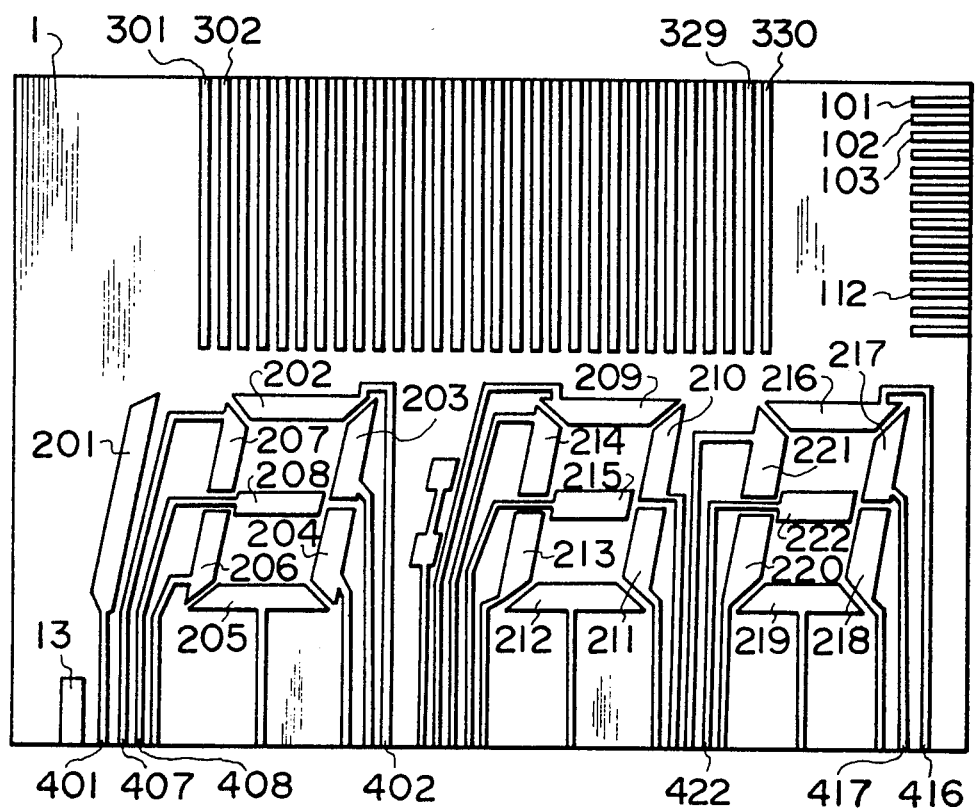
FIG. 2 is a plan view showing the electrode structure on a substrate in FIG. 1.
Figure 3:
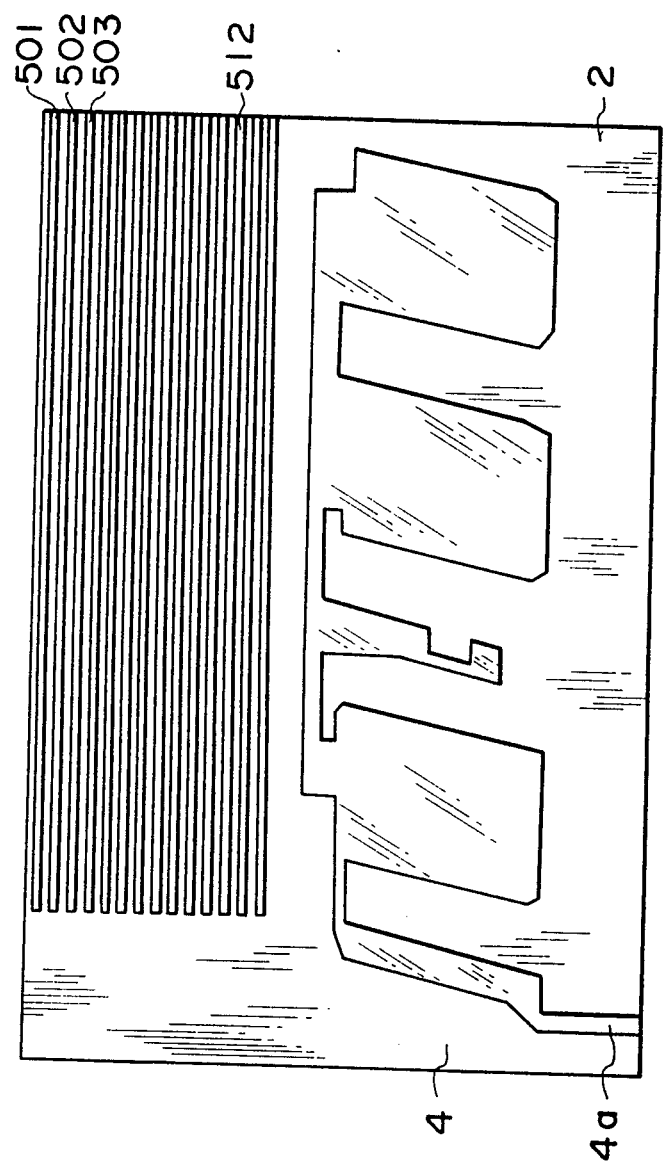
FIG. 3 is a plan view showing the counter electrode structure on another substrate in FIG. 1.

FIG. 2 and FIG. 3 show an embodiment of the transparent substrate 1 and the second transparent substrate 2 respectively.

In FIG. 2, on the lower half part of the first transparent substrate 1, segment display electrodes 201, 202, . . . , . . . 222, leads 401, 402, . . . , 422 connected to the segment electrodes respectively and an external connecting terminal 13 are provided.

On the upper half part, many parallel linear electrodes 301, 302, . . . , 330 for the dot matrix display are provided. On the upper right hand, external connecting terminals 101, 102, . . . , for the counter electrode 6 for the dot matrix display are provided.

On the lower half part of the second transparent substrate 2, a counter electrode 4 for the segment display corresponding to the segment display electrode is provided as shown in FIG. 3.

On the upper half part, many parallel linear counter electrodes 501, 502, . . . , 512 for the dot matrix display are formed perpendicularly to the electrodes 301, 302, . . . , 330 for dot matrix display. These counter electrodes 501, 502, . . . , 512 for the dot matrix display are connected to the external connecting terminals 101, 102, . . . respectively through conductive materials, e.g., silver paste, indium or lead, which is provided on the side of the spacer 11. The lead terminal 4a of the counter electrode 4 for the segment display is similarly connected to the external connecting terminal 13 through a conductive material. Each electrode is connected to an external driving circuit through the leads 401, 402, . . . , 416 and 417, the terminals of the electrodes 301, 302, . . . , 330 and the external connecting terminal 13 and 101, 102, . . . respectively.

The counter electrode 4 for the segment display in FIG. 3 is common to each digit in order to drive statically. In order to perform multiplex drive, it may divide the counter electrode to every digit or every two digits. If the dot matrix display is performed by multiplex drive, it is possible to obtain various kinds of display, e.g., a display of numeral letters or a display of letters.

Figure 4:
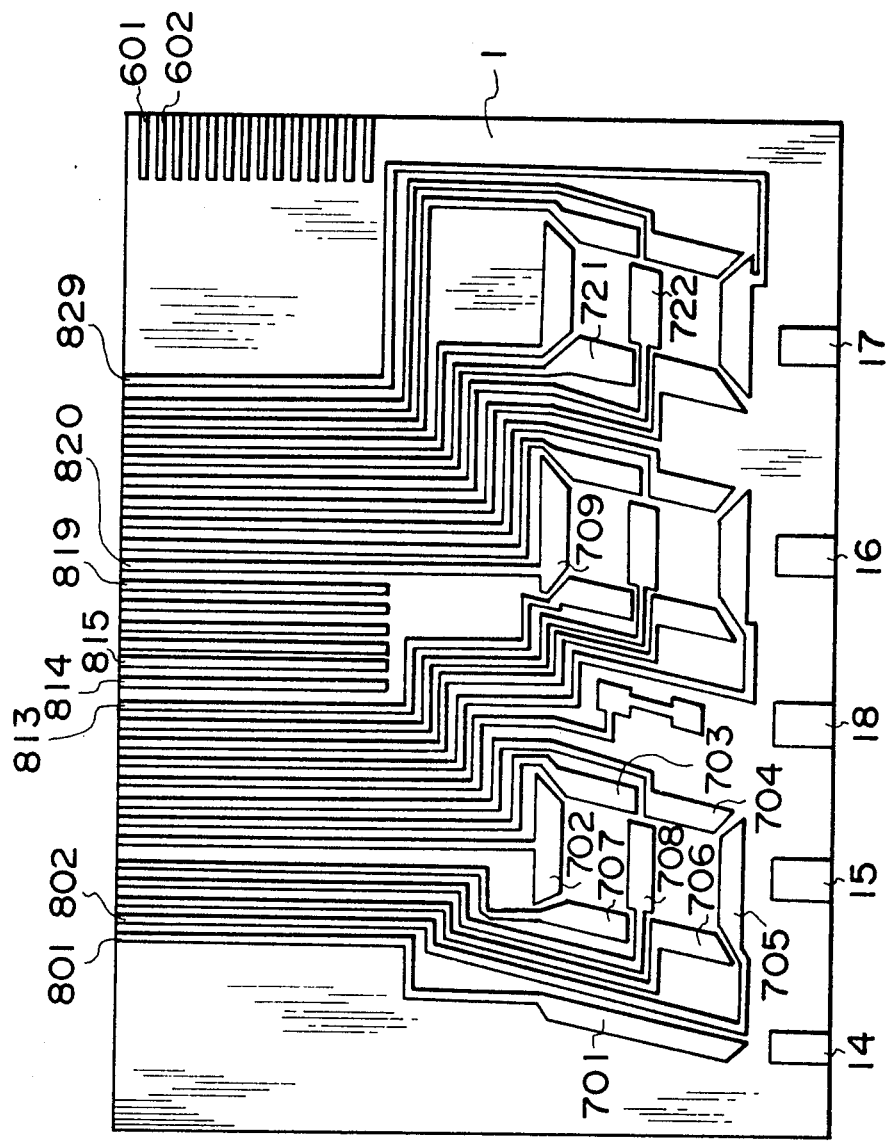
FIG. 4 is a plan view showing another embodiment of the invention which includes both of the lead electrodes for segment display and the dot matrix display electrodes.
Figure 5:
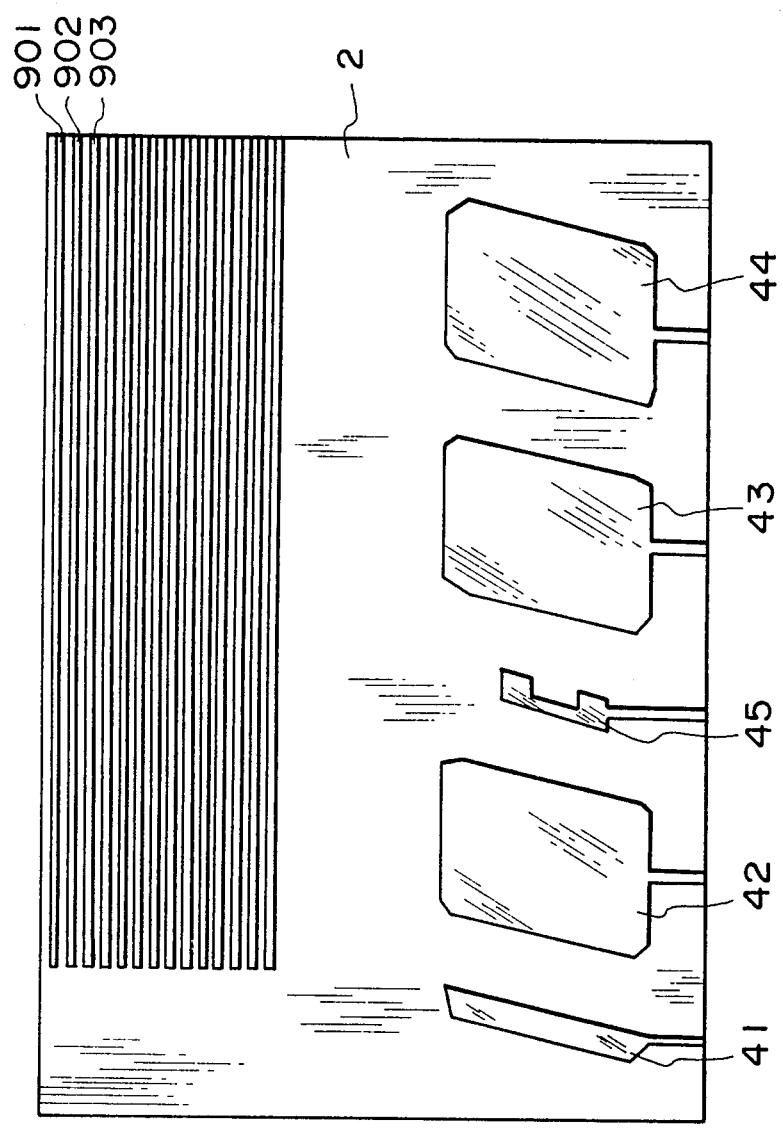
FIG. 5 is a plan view showing the electrodes opposed to these shown in FIG. 4.

FIG. 4 and FIG. 5 show another embodiment of the transparent electrodes formed on the first and second transparent substrates respectively.

On the transparent substrate 1 as shown in FIG. 4, segment display electrodes 701, 702, . . . , 722, dot matrix display electrodes 801, 802, . . . , 829, external connecting terminals 601, 602, . . . for the dot matrix display counter electrodes and external connecting terminals 14, 15 . . . , 18 for the segment display counter electrodes are formed, similarly to the embodiment shown in FIG. 2. What differs from the embodiment of FIG. 2 is the fact that the leads of the segment display electrodes 701, 702, . . . , 722 also serve as leads for some of the dot matrix display electrodes 801, 802, . . . , 813, 820, . . . , 829 respectively. By this manner, it is possible to reduce the number of lead terminals in comparison with the embodiment as shown in FIG. 2 and to obtain a display device having a very simple structure. In this case, the number of the dot matrix display electrodes 801, 802, . . . , 829 may be the same as that of the segment display electrodes 701, 702, . . . , 722. However, it is possible to add only dot matrix electrodes in order to increase the number of dots, as shown by the dot matrix display electrodes 814, 815, . . . , 819 in FIG. 4.

On the transparent substrate 2 as shown in FIG. 5, dot matrix display counter electrodes 901, 902, . . . , 908 and segment display counter electrodes 41, 42, . . . , 45 are formed, similarly to the embodiment as shown in FIG. 3. In this figure, the segment display counter electrodes 41, 42, . . . , 45 are divided to every digit in order to perform not only dot matrix display but also segment display by multiplex drive. The segment display counter electrodes 41, 42, . . . , and 45 may be common to every digit similarly to that shown in FIG. 3, however, in this case, the display device has the disadvantage that the drive circuit or the like is more complicated. For that reason, in the case of serving both as the leads of the segment display electrodes and the dot matrix display electrodes, it is desirable to divide the dot matrix display counter electrode to every one digit as shown in FIG. 5, to every two digits or to every three digits.

FIG. 6 shows an embodiment which displays hours 18 and minutes 19 by a segment display and day 20 and date 21 by a dot matrix display by means of the display device of the invention. It is easy to change the language of the day, e.g., from English to Japanese, French or German by changing an external driving circuit or a memory circuit.

As mentioned above, according to the invention, it is possible to provide an electro-optical display device having the advantage of a to segment display in that it may display time information, e.g., hour, minute or second, by a small number of elements and the advantage of a dot matrix display in that it may display finely letters, e.g., day, and may change to various languages easily.

I claim:

1. In an electro-optical display device comprising a transparent first substrate having a transparent first electrode, a second substrate having a second electrode, and an electro-optical material sandwiched between the first and second electrodes; the improvement wherein one of said first and second electrodes comprises a segment display electrode part having a plurality of 7-segment digits each of which forms the figure 8, and a dot matrix display electrode part having many parallel linear electrodes, at least a part of the leads of said 7-segment digits comprising at least some of said dot matrix display electrodes; and wherein the other of said first and second electrodes comprises a counter electrode part corresponding to said segment display electrode part, and another counter electrode part having many parallel linear electrode perpendicularly intersecting said parallel linear electrodes of said dot matrix display electrode part; both the segment display and the dot matrix display being arranged for multiplex drive.

2. An electro-optical display device as claimed in claim 1; wherein said electro-optical material comprises liquid crystal.

3. An electro-optical display device as claimed in claim 1; wherein said electro-optical material comprises PLZT.

4. An electro-optical device as claimed in claim 1; wherein said electro-optical material comprises a single crystal material exhibiting the electro-optical effect.

5. An electro-optical display device as claimed in claim 1; wherein the electro-optical material comprises two electro-optical materials different from one another disposed over respective ones of said segment display electrode part and said dot matrix display electrode part.

6. An electro-optical display device as claimed in claim 5; wherein said two electro-optical materials comprise different kinds of liquid crystals separated by a sealing member.

7. An electro-optical display device as claimed in claim 5; wherein at least one of said two electro-optical materials comprises a solid state display element.

8. An electro-optical display device as claimed in claim 2; wherein said segment display electrode part and said dot matrix display electrode part are formed by alignment treatments which give different liquid crystal orientations.

9. An electro-optical display device as claimed in claim 6; wherein said segment display electrode part and said dot matrix display electrode part are formed by alignment treatments which give different liquid crystal orientations.

10. In an electro-optical display device for a timepiece or the like having a segment display comprised of a plurality of 7-segment electrodes and a dot matrix display comprised of a plurality of perpendicularly intersecting linear electrodes, the improvement comprising: a plurality of electrode leads connected to respective ones of the 7-segment electrodes with at least some of said leads comprising some of said linear electrodes of the dot matrix display.

11. An electro-optical display device according to claim 10; wherein both said segment display and said dot matrix display are disposed for multiplex drive.

12. An electro-optical display device according to claim 10; wherein said segment display includes a first electro-optical material and said dot matrix display includes a second electro-optical material.

13. An electro-optical display device according to claim 12; wherein said first and second electro-optical materials are different.